United States Patent
Poddar

(10) Patent No.: US 9,449,362 B2
(45) Date of Patent: Sep. 20, 2016

(54) TECHNIQUES FOR REDUCING ACCESSES FOR RETRIEVING TEXTURE IMAGES

(71) Applicant: Intel Corporation, Santa Clara, CA (US)

(72) Inventor: Bimal Poddar, El Dorado, CA (US)

(73) Assignee: INTEL CORPORATION, Santa Clara, CA (US)

( * ) Notice: Subject to any disclaimer, the term of this patent is extended or adjusted under 35 U.S.C. 154(b) by 132 days.

(21) Appl. No.: 14/020,716

(22) Filed: Sep. 6, 2013

(65) Prior Publication Data

US 2015/0070371 A1   Mar. 12, 2015

(51) Int. Cl.
*G06T 1/60*   (2006.01)
*G06T 1/20*   (2006.01)
*G06T 11/00*   (2006.01)

(52) U.S. Cl.
CPC .  *G06T 1/60* (2013.01); *G06T 1/20* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 5,612,979 A * | 3/1997 | Takano | 375/354 |
| 6,078,694 A * | 6/2000 | Takahashi et al. | 382/238 |
| 2010/0026697 A1* | 2/2010 | Xiang et al. | 345/564 |
| 2012/0324248 A1* | 12/2012 | Schluessler et al. | 713/300 |
| 2013/0328889 A1* | 12/2013 | Chen et al. | 345/501 |
| 2014/0184632 A1* | 7/2014 | Donovan | 345/589 |
| 2015/0062154 A1* | 3/2015 | Ellis et al. | 345/619 |

\* cited by examiner

*Primary Examiner* — Kee M Tung
*Assistant Examiner* — Xin Sheng

(57) ABSTRACT

Various embodiments are generally directed to techniques for reducing storage access bandwidth requirements in retrieving a texture image from a storage for applying textures to rendered objects by rendering the texture image itself into the storage to reduce the storage space in which the texture image is stored and to arrange portions of the texture image to be retrieved with fewer accesses. A device to render images includes a processor component; a color analyzer to determine a clear color of a texture image stored as source texture data; and a rendering routine to render the texture image into a storage as reduced texture data, the rendering routine to selectively store in the reduced texture data pixel color values retrieved from the source texture data that are associated with pixels of the texture image not colored with the clear color. Other embodiments are described and claimed.

22 Claims, 12 Drawing Sheets

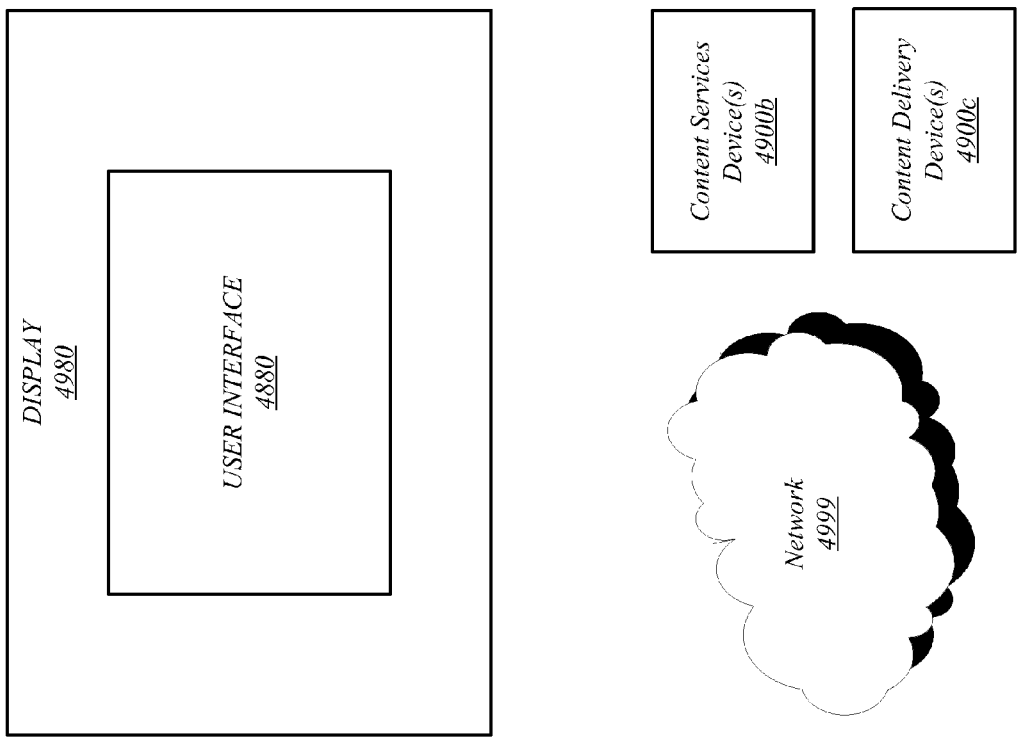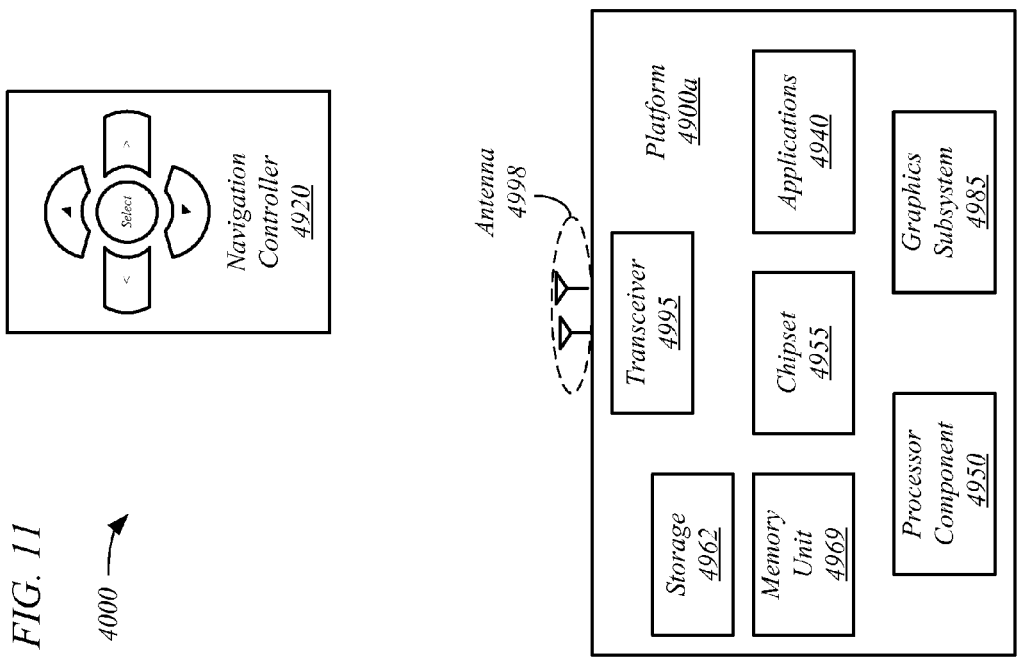
FIG. 11

TECHNIQUES FOR REDUCING ACCESSES FOR RETRIEVING TEXTURE IMAGES

TECHNICAL FIELD

Embodiments described herein generally relate to reducing power consumption in storing and accessing texture images to apply textures when rendering display images.

BACKGROUND

While compressed textures are widely used in the industry, there are no universal agreed on formats that are available on all platforms. Application software that must work on multiple platforms have to either support multiple compressed texture formats resulting in increased application complexity, or choose to use uncompressed texture formats which is the one option that is universally available on all platforms. Additionally, there are some texture images, such as fonts, that don't compress well using some of the accepted types of compression, resulting in jagged edges.

Storage devices (e.g., dynamic random access memory devices) have become sufficiently inexpensive that the larger amount of storage space taken by uncompressed texture images versus compressed texture images is generally not seen as a cause for concern. However, retrieving uncompressed texture images from storage for use in applying textures to rendered objects can require significantly more storage accesses than retrieving compressed texture images. Such increases in the number of accesses arising from the use of uncompressed texture images can become significant where the application of textures is done for each frame of a series of frames of computer-generated animation.

Increases in the number of storage accesses entails greater use of buses and buffer components, all of which consumes electric power at a greater rate. This greater rate of consumption can become significant in portable computing devices relying on electric power sources of limited capacity, such as a battery.

BRIEF DESCRIPTION OF THE DRAWINGS

FIG. 11 illustrates another alternate embodiment of a rendering system.

DETAILED DESCRIPTION

Figure 1:
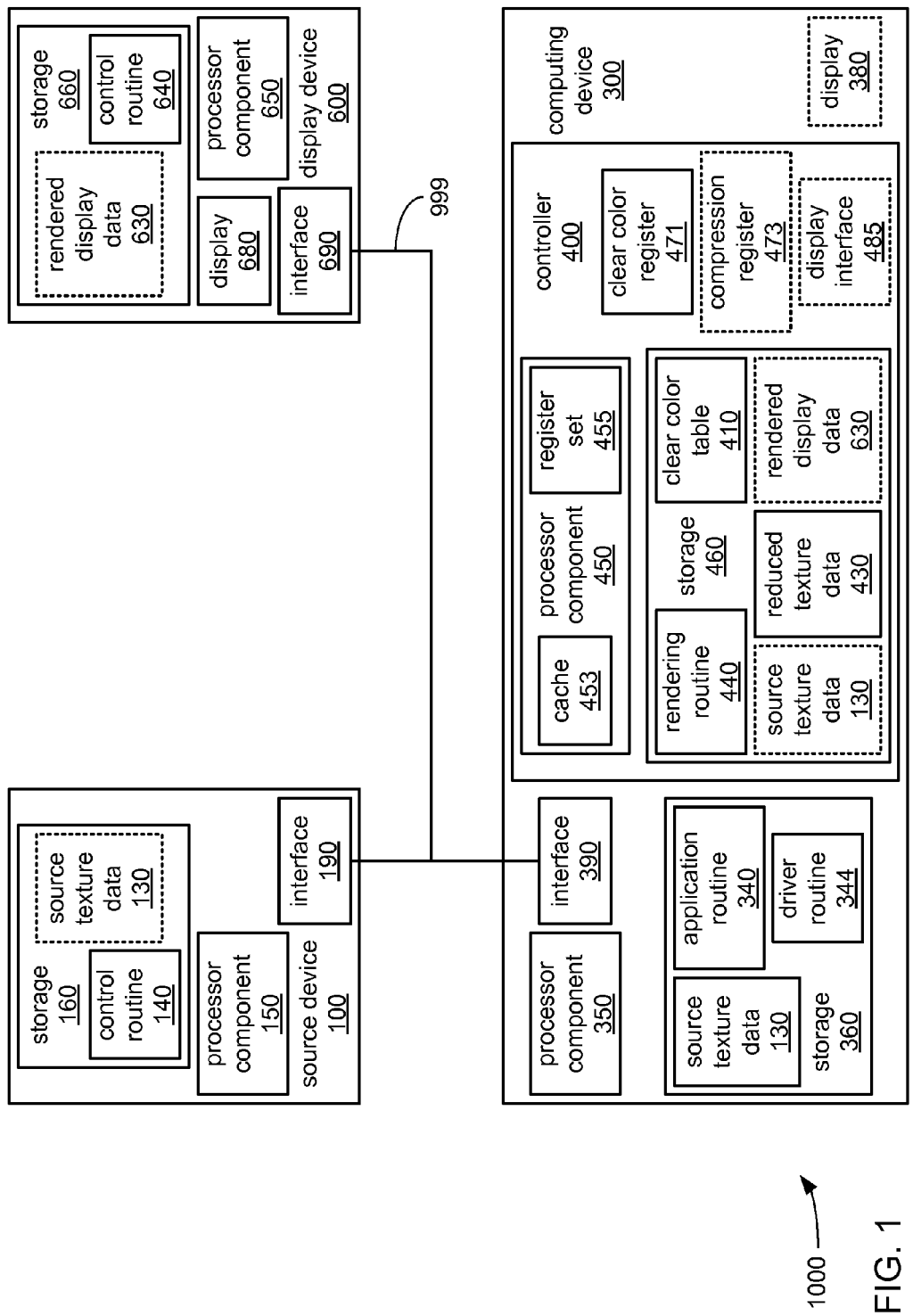
FIG. 1 illustrates an embodiment of a rendering system.

Various embodiments are generally directed to techniques for reducing storage accesses in retrieving a texture image from a storage for applying textures to rendered objects by rendering the texture image itself into the storage to reduce the storage space in which the texture image is stored and to organize portions of the texture image to be retrievable with fewer accesses. During such rendering, the texture image may be analyzed to determine a clear color and which pixels of the texture image are colored with the clear color. Also, the pixel color values of the texture image may be reorganized from a raster-scan order to a tiled order corresponding to two-dimensional blocks of pixels. Further, pixel color values of two or more adjacent blocks of pixels may be compressed to occupy storage space allocated for a single uncompressed block of pixels.

As familiar to those skilled in the art, it is not uncommon for a texture image to have a non-rectilinear shape. However, graphics systems are typically configured to store and work only with images having a rectilinear configuration. Thus, common practice entails "padding" a non-rectilinear image, including a non-rectilinear texture image, with surrounding pixels to give that image a rectilinear shape. As a result of this common practice, it is not uncommon for pixels at the corners of a texture map to be among the pixels added as part of such padding, and for those pixels to be colored with a clear color. In analyzing the texture image to determine a clear color, various heuristic algorithms may be employed, including analyzing the pixel color values of pixels at the corners of the texture image.

Once the clear color is determined, its pixel color value (e.g., a binary numerical value that indicates a pixel's color) is stored separately from the texture image (e.g., in a register), and a table or other data structure is created indicating which pixels (or blocks of pixels) are colored with the clear color. This enables accesses to storage locations to store and retrieve the pixel color values of pixels colored with the clear color to be avoided, thereby reducing storage accesses. More specifically, the table is used to trigger reading of the pixel color value of the clear color from the register, rather than from storage locations, whenever the pixel color value is being retrieved from at least some of the pixels that are colored with the clear color.

As familiar to those skilled in the art, it is commonplace for the pixel color values of images to be stored and conveyed among computing devices in a raster-scan order that corresponds to the order in which the pixels are typically scanned onto a display to be viewed. The order in which the pixel color values of the pixels of the texture image are stored may be reorganized into a tiled order corresponding to a division of the texture image into two-dimensional blocks of pixels. Such a tiled order provides better two-dimensional locality in the manner in which pixel color data for each pixel is organized in storage, thereby improving the efficiency with which portions of a texture images may be fetched by reducing the number or accesses required to retrieve those portions.

A tiled order tends to reduce storage accesses for two-dimensional graphics operations by causing the pixels of each two-dimensional block of pixels to more easily fit within a single storage page of a storage. As familiar to those skilled in the art, various storage technologies divide storage space into storage pages (e.g., the pages defined in the typical row-column organization of single-bit storage cells within dynamic random access memory devices). In storage devices using such technologies, accessing pixel color values distributed across more than one storage page often requires entirely separate accesses to be made for each storage page and often incurs significant delays in progressing from retrieving data from one storage page to retrieving data from another.

A tiled order results in the pixel color values of the pixels within each of the blocks of pixels being stored in a contiguous set of storage locations within the storage. This increases the likelihood that accesses to the storage to retrieve pixel color values for pixels that are adjacent to each other along either of the two dimensions in the texture image will all be accesses to the same storage page.

As part of reorganizing pixel color values into a tiled order, advantage may be taken of pixels within sub-blocks of pixels of the texture image having similar colors or the same color to compress the color pixel values of two more adjacent sub-blocks into a storage space of the storage that would otherwise correspond only to a single sub-block. Doing so results in the pixel color values of the pixels within two or more of the sub-blocks being stored in a contiguous set of storage locations that occupy a smaller amount of space within the storage. As a result, the overall footprint of the pixel data of the texture within the storage may not be reduced, but accesses to retrieve the pixel data of multiple sub-blocks will result in accesses to fewer of the storage locations within that that footprint which will result in fewer accesses to the storage, overall.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a rendering system 1000 incorporating one or more of a source device 100, a computing device 300 and a display device 600. In the rendering system 1000, a texture image that may be received from the source device 100 is rendered into storage to thereby store it in a manner that reduces storage accesses for subsequently retrieving it for use in applying textures to rendered objects during rendering of a display image. The resulting rendered display image may be visually presented by the computing device 300 or may be sent to display device 600 to be visually presented. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 600 exchange signals conveying a texture image and/or a display image rendered using the texture image through a network 999. However, one or more of these computing devices may exchange other data entirely unrelated to texture images or the display images rendered using texture images with each other and/or with still other computing devices (not shown) via the network 999. In various embodiments, the network may be a single network that may be limited to extending within a single building or other relatively limited area, a combination of connected networks that may extend a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the source device 100 incorporates one or more of a processor component 150, a storage 160 and an interface 190 to couple the source device 100 to the network 999. The storage 160 stores one or more of source texture data 130 and a control routine 140. The control routine 140 incorporates a sequence of instructions operative on the processor component 150 to implement logic to perform various functions. In executing the control routine 140, the processor component 150 provides the computing device 300 with a texture image represented by the source texture data 130. As depicted, the interface 190 may couple the source device 100 to the computing device 300 through the same network 999 as couples the computing device 300 to the display device 600. However, in other embodiments, the source device 100 may be coupled to the computing device 300 in an entirely different manner.

In various embodiments, the computing device 300 incorporates one or more of a processor component 350, a storage 360, a display 380, a controller 400 and an interface 390 to couple the computing device 300 to the network 999. The storage 360 stores one or more of the source texture data 130, an application routine 340 and a driver routine 344. The controller 400 incorporates one or more of a processor component 450, a storage 460, a clear color register 471, a compression register 473 and a display interface 485. The processor component 450 incorporates one or both of a cache 453 and a register set 455. The storage 460 stores one or more of a copy of the source texture data 130, reduced texture data 430, a clear color table 410, a rendering routine 440 and rendered display data 630.

The application routine 340 and the driver routine 344 each incorporate a sequence of instructions operative on the processor component 350 in its role as a main processor component of the computing device 300 to implement logic to perform various functions. The application routine 340 may be any of a variety of applications that make use of rendering in which texture mapping is performed, including and not limited to, a computer-aided design (CAD) application, a computer-based video game application, etc. The driver routine 344 may be a device driver providing at least a portion of an interface between the application routine 340 and other components of the computing device 300 that perform rendering with texture mapping (e.g., the controller 400).

In executing the application routine 340 in some embodiments, the processor component 350 may receive the source texture data 130 representing a texture image from the source device 100. Alternatively or additionally, the processor component 350 may generate at least a portion of the source texture data 130. Regardless of the exact manner in which the source texture data 130 is received and/or generated, it is conveyed to the driver routine 344 in preparation for use in rendering an image.

In executing the driver routine 344 in some embodiments, the processor component 350 may cooperate with components of the controller 400 to copy the source texture data 130 from the storage 360 to the storage 460 of the controller 400. Aside from making the source texture data 130 available locally to the processor component 450 of the controller 400, this copying of the source texture data 130 may also be necessitated by the source texture data 130 originally being stored in a portion of the storage 360 that renders it subject to being "swapped" among different storage devices of the storage 360. More specifically, the computing device 300 may implement a form of "virtual memory" in which portions of data and/or routines are swapped between non-volatile storage devices (e.g., hard disk drives) and volatile storage devices (e.g., random-access memory devices) depending on frequency of being accessed and/or the elapsing of time since last being accessed.

The rendering routine 440 incorporates a sequence of instructions operative on the processor component 450 in its role as a controller processor component of the controller 400 of the computing device 300 to implement logic to perform various functions. More specifically, the rendering routine 440 implements a rendering engine executed by the processor component 450. In executing the rendering routine 440, the processor component 450 is normally caused to render an image that is to be displayed, the image normally being a two-dimensional (2D) view of one or more three-dimensional (3D) objects from a selected direction. In such normal execution of the rendering routine 440, one or more texture maps may be retrieved from the storage 460 and used to apply one or more textures to portions of those objects in the 2D image.

However, in executing the rendering routine 440, the processor component 450 is also caused to retrieve the source texture data 130 and to render the texture image represented by the source texture data 130 into another portion of the storage 460 as the reduced texture data 430. Thus, the rendering engine logic of the rendering routine 440 is employed to render a texture image, instead of using texture images to render an image to be displayed. As will shortly be explained, such rendering of that texture image enables one or more features of the rendering routine 440 (e.g., one or more rendering shaders associated with the rendering engine) to be applied to the source texture data 130. Such use of the rendering routine 440 may be triggered by a signal from the device routine 344 to do more than simply copy the source texture data 130 into the storage 460 as part of making the source texture data 130 available to the processor component 450 for use in applying textures.

In executing the rendering routine 440 to render the texture image of the source texture data 130 into the reduced texture data 430, the processor component 450 may analyze the texture image represented by the source texture data 130 to determine a clear color. As previously discussed, various heuristic algorithms may be employed, including analyzing the pixel color values of pixels at the corners of the texture image. Again, this is in recognition of the common practice of padding non-rectilinear images, including non-rectilinear texture images, with surrounding pixels to create a rectilinear shape. Again, this frequently results in the pixels at the corners being pixels that were added to provide such padding such that they are colored with a clear color.

Figure 3:
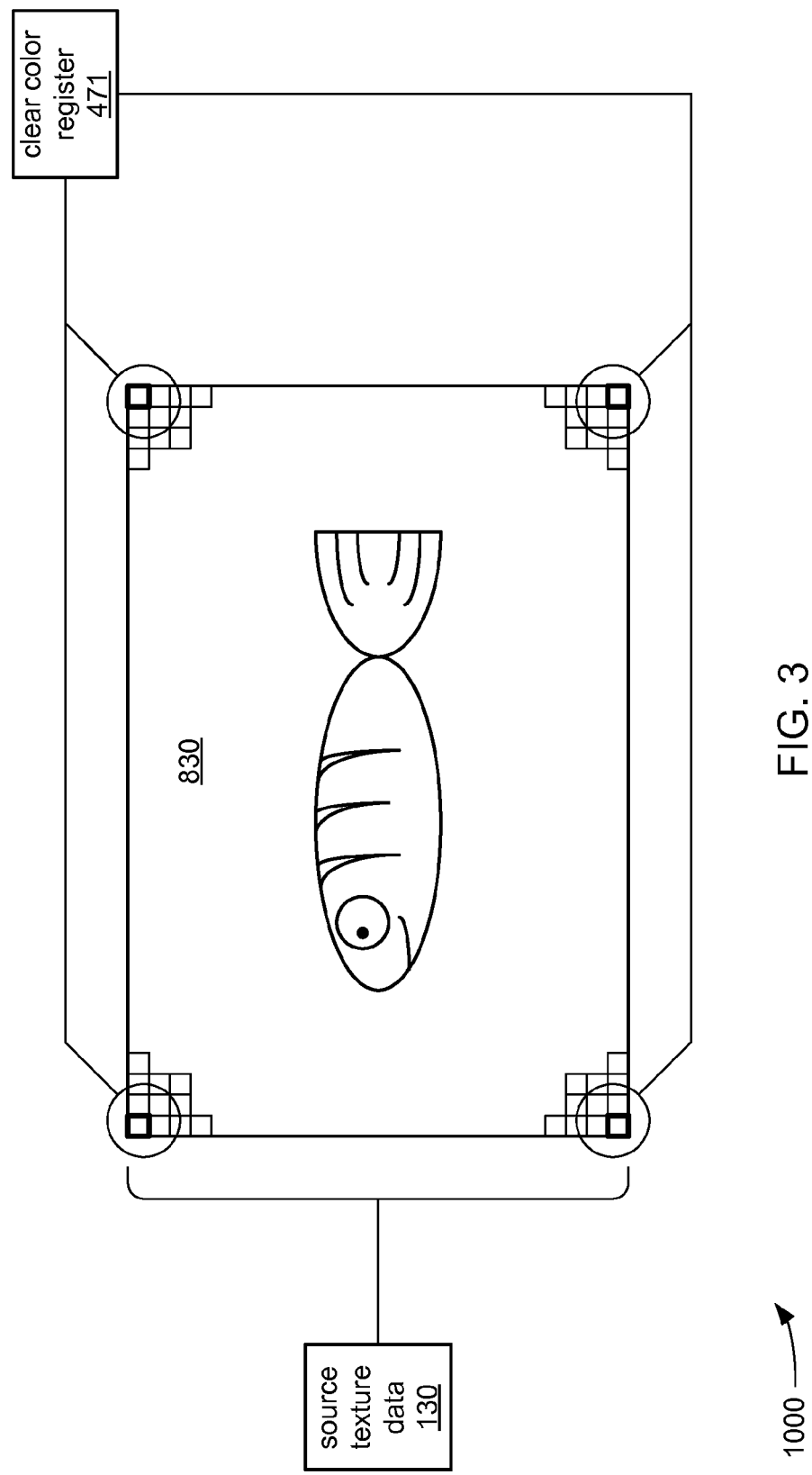
FIG. 3 illustrates determination of a clear color according to an embodiment.

FIG. 3 illustrates an example of a texture image 830 represented by the source texture data 130. For sake of visual clarity, the depicted texture of a side of an animated fish fills only a relatively small portion of the overall pixel area of the texture image 830, and the specific pixels depicted at the corners may be of a somewhat exaggerated size compared to what might be expected in typical texture images.

Common choices of pixel color values to indicate a clear color are all 0's for all bits indicating red, green and blue (RGB) color components to indicate black, or all 1's for all bits of RGB color components to indicate white. However, still other pixel color values have been known to be used, and are often selected based on an assumption of their being unlikely to be used in pixels that are not colored with the clear color. In response to instances in which an analysis of pixel color values at the corners and/or in other locations reveals more than one possible pixel color value indicative of the clear color, the processor component 450 may adopt a default pixel color value that is assumed to indicate the clear color, such as all 0's indicative of black or all 1's indicative of white. It should be noted that even if such an assumption is wrong such that the assumed clear color isn't actually a clear color, there is no effect on the ability to later use the texture image 830 to apply textures in the sense that the details of the texture image 830 are not altered. The only disadvantage of a wrong assumption as to what is the clear color is a lost opportunity to decrease the number of accesses required in retrieving portions of the texture image 830 in such later use.

Returning to FIG. 1, once the clear color is determined, the processor component 450 may store the pixel color value indicating the clear color in the clear color register 471 and initialize the clear color table 410 to indicate that all pixels are colored with the clear color. Indications of what pixels in the texture image 830 of the source texture data 130 are colored with a color other than the clear color will be stored in the clear color table 410 as such pixels are found during rendering of the texture image 830. The indications of what pixels are so colored may be indicated on a per-pixel basis or on a basis of per group of pixels. In embodiments in which the clear color table 410 indicates groups of pixels in which all of the pixels are colored with the clear color, the number of pixels making up each such group may be selected to enable the pixel color data of all pixels within a group to fit within a cache line of the cache 453 and/or a register of the register set 455 of the processor component 450.

The indications of which pixels (or groups of pixels) are colored with the clear color in the clear color table 410 enables a reduction in storage accesses required in later retrievals of the reduced texture data 430 by the processor component 450 from the storage 460. More specifically, during retrieval of a portion of the reduced texture data 430, the processor component 450 may use indications from the clear color table 410 of what pixels (or groups of pixels) within that portion are colored with the clear color to avoid making storage accesses to retrieve the pixel color values for those pixels from the reduced texture data 430 stored in the storage 460. Instead of retrieving the pixel color value for those pixels from the reduced texture data 430, the processor component 450 retrieves the pixel color value for the clear color from the clear color register 471, which may be capable of providing that pixel color value significantly more quickly than the storage 460.

The rendering of the texture image 830 into the storage 460 as the reduced texture data 430 may be performed by the processor component 450 executing the rendering logic of the rendering routine 440 accompanied with a shader. The shader may be a script or machine-readable code directing the rendering routine 440 to selectively store only pixel color values of pixels not colored with the clear color. As familiar to those skilled in the art, such operations as "killpix" or "discard" may be employed in such a shader to cause the rendering routine 440 to refrain from writing pixel color values of pixels colored with the clear color. Along with such selective storage of pixel color values, the processor component 450 may update the clear color table 410 (following its initialization to show all pixels as colored with the clear color) with indications of individual pixels (or groups of pixels) that are colored with a color other than the clear color. It should be noted that in embodiments in which the clear color table 410 indicates groups of pixels that are colored with the clear color (instead of individual pixels), only one pixel of a group of pixels need be colored with some other color than the clear color for that entire group to be indicated in the clear color table 410 as not being colored with the clear color.

Figure 4:
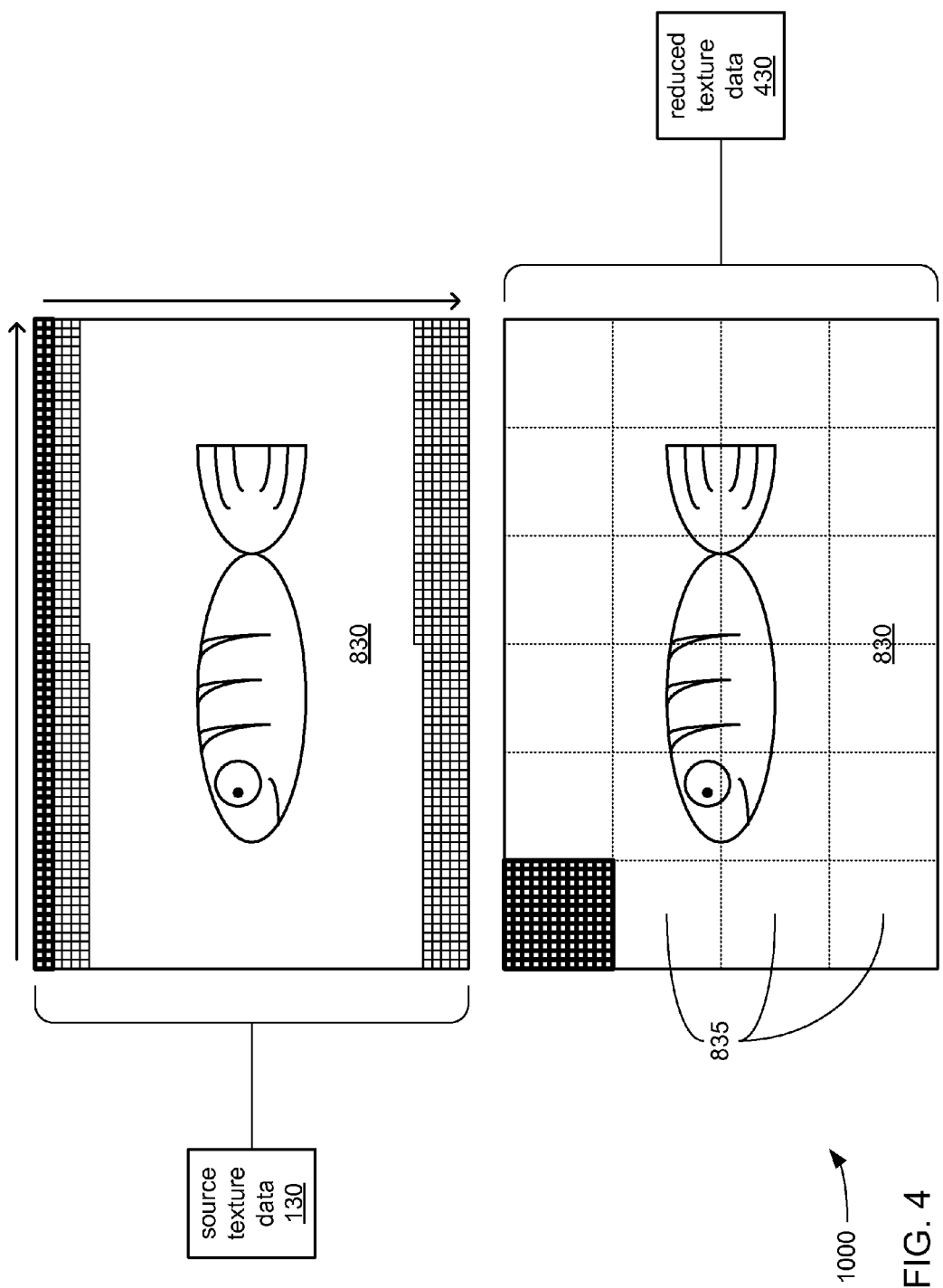
FIG. 4 illustrates reorganization of pixel color values according to an embodiment.

In further executing the rendering routine 440 to render the texture image 830 of the source texture data 130 into the reduced texture data 430, the processor component 450 may also reorganize the order in which pixel color values of the pixels of the texture image 830 are stored from a raster-scan order to a tiled order. FIG. 4 illustrates an example of differences between a raster-scan order in which the pixels of the texture image 830 may be organized in the source texture data 130 and a tiled order in which the pixels of the texture image 830 may be organized in the reduced texture data 430 that corresponds to a tiled array of blocks 835 of pixels.

As depicted, a raster-scan order may start in the upper left-hand corner of the texture image 830, proceed rightward across the top row of its pixels, and iterate a row at a time downward through the rows of the texture image 830 to the bottom row, proceeding rightward across the pixels in each of those rows. In contrast and as also depicted, a tiled order may progress from one block 835 to another, and within each block 835, may start at a pixel at a corner and progress through the pixels within each block 835 in a raster-scan order before proceeding to a next block 835 within which the raster-scan order is followed among its pixels, and so on, iterating through one block 835 at a time. It should be noted, however, that within each block 835, an order other than a raster-scan order may be followed.

A tiled order causes the pixel color values of the pixels within each of the blocks 835 to be stored in a contiguous storage locations within the storage 460 such that the pixel color values of pixels that are adjacent to each other in each block 835 along either of the two dimensions are stored more closely together (in other words, have improved locality) within the storage 460. As familiar to those skilled in the art, the portions of texture images used in applying textures to rendered objects in a rendered image are almost always 2D portions, and not one-dimensional portions of rows or columns of pixels. Thus, reorganization into a tiled order increases the likelihood that a retrieved 2D portion of the texture image 830 used in applying a texture to a rendered object will result in the retrieval of pixel color values that are stored in relatively closely located storage locations within the storage 460. In turn, this increases the likelihood that fewer accesses (or only a single access) to the storage 460 will be required to retrieve the pixel color values for all of the pixels in the retrieved 2D portion.

This reorganization also increases the likelihood that all of the pixels of a portion of the texture image 830 retrieved to apply a texture will be stored within a single storage page of the storage 460 in embodiments in which some or all of the storage 460 is divided into storage pages. Reducing the number of storage pages that must be accessed to retrieve pixels of a 2D portion of the texture image 830 required to apply a texture reduces the number of accesses required to retrieve those pixels. As illustrated with pixels depicted with bolder lines in FIG. 4 for an example in which each storage page is able to store pixel color values for only a quantity of pixels fills two rows in raster-scan ordering, each such a page could alternatively store pixel color values for that same quantity of pixels, but where those pixels are of a two-dimensional portion of the texture image 830 where in tiled ordering.

Figure 5:
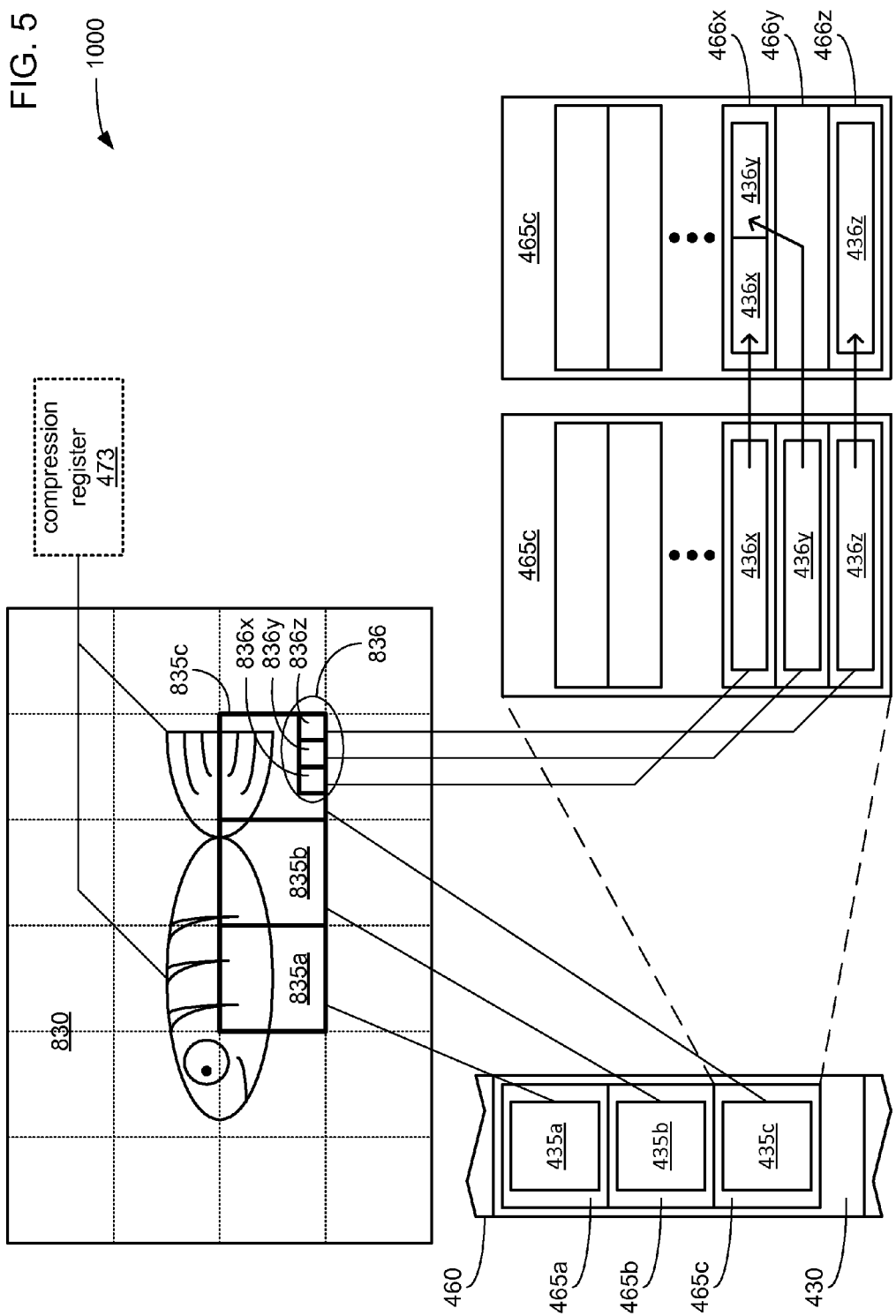
FIG. 5 illustrates compression of pixel color values according to an embodiment.

Turning to FIG. 5, in still further executing the rendering routine 440 to render the texture image 830 of the source texture data 130 into the reduced texture data 430, the processor component 450 may analyze the pixel color data of pixels of adjacent sub-blocks 836 making up each of the blocks 835 to identify instances in which the pixel color data of two or more of the sub-blocks 836 are able to be compressed together. More specifically, the pixel color data stored in storage areas associated with two or more of the sub-blocks 836 are analyzed to identify instances in which their pixel color data can be compressed to fit within a single storage area associated with only one of those two or more sub-blocks 836.

FIG. 5 illustrates an example of such compression among sub-blocks 836x-z of a block 835c of the texture image 830. It should be noted that each of the blocks 835a-c is an instance of one of the blocks 835 of pixels introduced in FIG. 4, and each of the sub-blocks 836x-z is an instance of one of the sub-blocks 836 made up of a subset of the pixels of one of the blocks 835. As depicted, the blocks 835a-c are adjacent to each other in the texture 830, and the sets of pixel color values 435a-c associated with the pixels of the blocks 835a-c are stored in adjacent storage areas 465a-c, respectively, within the storage 460. The storage areas 465a-c are contiguous such that the individual storage locations storing individual pixel color values are contiguously addressable throughout. As also depicted, the storage area 465c is subdivided into smaller storage areas, one each corresponding to one of the sub-blocks 836 of the block 835*c*, including smaller storage areas 466*x-z* in which are stored color pixel values 436*x-z* of the pixels of the sub-blocks 836*x-z*, respectively. While the amount of pixel data making up each of the blocks 835 may be selected to at least substantially fill a single storage page, the amount of pixel data making up each of the sub-blocks 836 may be a smaller amount selected to fill a single cache line of the cache 453. It should be noted that in various embodiments, each sub-block 836 may be made up of a two-dimensional array of pixels as shown, or may be made up of a line of pixels (not shown).

During reorganization of the pixel color values into a tiled order, the processor component 450 analyzes each of the sets of pixel color values 436*x-z* to determine the extent to which each such set may be compressed. In response to determining that the sets of pixel color values 436*x* and 436*y* in the smaller storage areas 466*x* and 466*y* are able to be compressed such that all of them would fit within the smaller storage area 466*x*, the processor component 450 so compresses the pixel color values of the sets of pixel color values 436*x* and 436*y* and organizes those pixel color values to fit entirely within the smaller storage area 466*x*. As depicted, the result is that the smaller storage area 466*y* is no longer used to store pixel color values of the texture image 830 (despite having been allocated to store the set of pixel color values 436*y*) such that the storage of the pixel color values of the pixels of the texture image 830 is not contiguous due to there being unused storage space between the sets of pixels color values 436*y* and 436*z*. Thus, although such compression leads to the reduced texture data 430 occupying less of the storage 460, the storage space originally allocated to store the reduced texture data 430 is not reduced, thereby allowing discontiguous portions of the texture data 430 to remain disposed at various locations throughout that originally allocated space.

It should be noted that other embodiments are possible in which the processor component 450 analyzes pixel colors of adjacent ones of the blocks 835 (instead of some form of sub-block), to identify instances in which the pixel color data of two or more of the blocks 835 are able to be compressed together. More specifically, the pixel color data stored in storage areas associated with two or more of the blocks 835 (e.g., the blocks 835*a-c*) are analyzed to identify instances in which their pixel color data can be compressed to fit within a single storage area associated with only one of those two or more blocks 835. By way of example, the pixel color data 435*a* and 435*b* associated with the blocks 835*a* and 835*b* may be compressed together to fit entirely within the storage area 465*a*, such that the storage area 465*b* becomes unused storage space between the storage areas 465*a* and 465*c*. Thus, the blocks that are defined during reorganization into a tiled ordering may, in some embodiments, be the same blocks that may be combined during compression.

Although the processor component 450 may employ any of a variety of types of compression to compress pixel color values within each of the sub-blocks 836, it may be deemed desirable to employ a relatively simple lossless compression such as a version of Huffman coding, run-length encoding (RLE), etc., in which advantage may be taken of various characteristics of the colors used within each of the sub-blocks 836. Such simpler types of compression requires less in the way of processor resources such that advantages in reduced power consumption gained through the techniques described herein are not entirely negated by employing a type of compression that results in increased power consumption by a processor component.

By way of example, using the indications in the clear color table 410 of which pixels (or groups of pixels) are colored with the clear color, the processor component 450 may analyze the pixel color values of pixels not indicated as colored with the clear color to derive a median pixel color value. The processor component may store such a median pixel color value or other derived pixel color value for use in compression in the compression register 473. The processor component 450 may then compress pixel color values of the pixels of the sub-blocks 836*x* and 836*y* by replacing their pixel color values with pixel color difference values indicating the difference between each of the pixel color values and the derived median pixel color value. Compression would be achieved based on the likelihood that the bit values needed to indicate such differences are shorter, bit-wise, than the original bit values that originally specified the colors for each of the pixels. The processor component 450 may further compress pixel color values by replacing instances of multiple identical pixel color difference values spanning multiple adjacent pixels with a single instance of that pixel color difference value and an indication of how many adjacent pixels share that same value.

Regardless of the exact type of compression used, the compression of the sets of pixel color values 436*x* and 436*y* (corresponding to the sub-blocks 836*x* and 836*y*, respectively) to fit entirely within the storage area 466*x* serves to further reduce the number of storage accesses required to retrieve at least some 2D portions of pixels of the texture image 830 for use in apply textures. Specifically, the pixel color values of the pixels of the sub-blocks 836*x* and 836*y* are caused to be more closely located within the storage 460 (in other words, caused to have improved locality) such that there is an increased likelihood that pixel color values of pixels of a 2D portion that spans both of the sub-blocks 836*x* and 836*y* will be retrievable with fewer accesses to the storage 460, if not retrievable with only a single access to the storage 460. Compression (of whatever type is selected) is performed as part of the conversion from raster-scan ordering to tiled ordering, instead of being performed as two independent operations. As a result, the compressing of textures does not result in a degradation in performance that would be visible to a user.

Returning to FIG. 1, with the texture image 830 rendered into a portion of the storage 460 to generate the reduced texture data 430 from the source texture data 130, the texture image 830 is accessible to the processor component 450 for use in applying textures to rendered objects with fewer accesses to the storage 460. Thus, at a later time, the rendered display data 630 representing a rendered image for display may be rendered by the processor component 450 using the reduced texture data 430 more quickly and/or with less power consumption. Upon being rendered, the processor component 450 may operate the display interface 485 to visually present the rendered image of the rendered display data 630 on the display 380 (if present). Alternatively or additionally, the processor component 450 may operate the interface 390 to transmit the rendered display data 630 to the display device 600, thereby enabling the rendered image of the rendered display data 630 to be visually presented on the display 680.

In various embodiments, the computing device 600 incorporates one or more of a processor component 650, a storage 660, a display 680 and an interface 690 to couple the computing device 600 to the network 999. The storage 660 stores one or more of the rendered display data 630 and a control routine 640. The control routine 640 incorporates a sequence of instructions operative on the processor component 650 to implement logic to perform various functions. In executing the control routine 640, the processor component 650 receives the rendered display data 630 from the computing device 300 and stores it in the storage 660. The processor component 650 then visually presents the rendered display 630 on the display 680.

Figure 2:
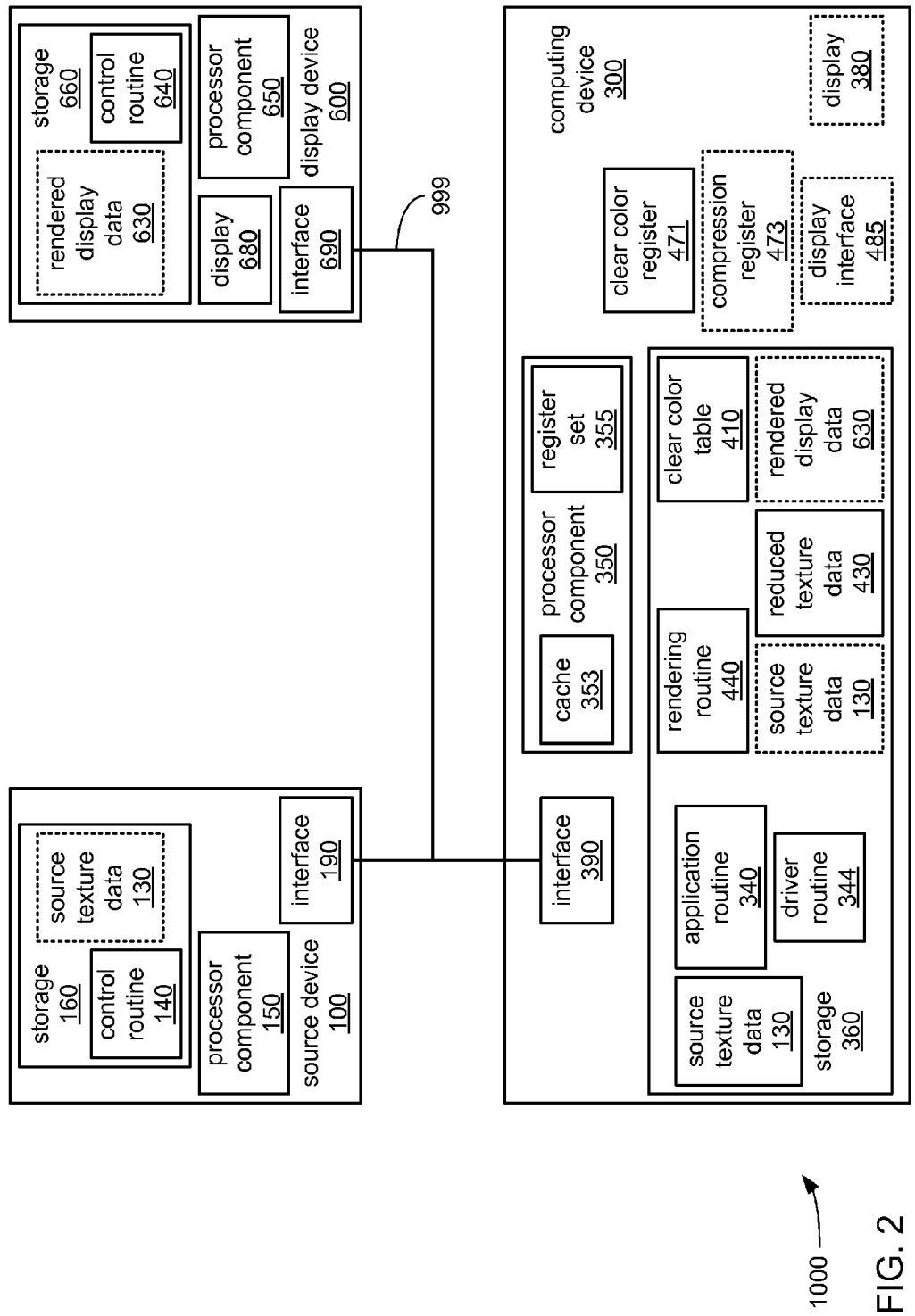
FIG. 2 illustrates an alternate embodiment of a rendering system.

FIG. 2 illustrates a block diagram of an alternate embodiment of the rendering system 1000 that includes an alternate embodiment of the computing device 300. The alternate embodiment of the rendering system 1000 of FIG. 2 is similar to the embodiment of FIG. 1 in many ways, and thus, like reference numerals are used to refer to like components throughout. However, unlike the computing device 300 of FIG. 1, the computing device 300 of FIG. 2 does not incorporate the controller 400. Also unlike the computing device 300 of FIG. 1, in the computing device 300 of FIG. 2, it is the processor component 350 that executes the rendering routine 440 to render the texture image 830 and images of objects to which portions of the texture image 830 may be applied in lieu of there being a processor component 450 to do so.

Thus, in the alternate embodiment of the rendering system 1000 of FIG. 2, the processor component 350 may copy the source texture data 130 from a swappable portion of the storage 360 to another portion of the storage 360 that is not swappable as part of an implementation of virtual memory. Further, the processor component 350 may render the texture image 830 of the source texture data 130 to generate the reduced texture data 430 while also performing one or both of reorganization from raster-scan ordering to tiled ordering and compression of neighboring sub-blocks 836 as discussed above.

In various embodiments, each of the processor components 350, 450 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 450 and 650 may include any of a variety of types of processor, it is envisioned that the processor component 450 of the controller 400 (if present) may be somewhat specialized and/or optimized to perform tasks related to graphics and/or video. More broadly, it is envisioned that the controller 400 embodies a graphics subsystem of the computing device 300 to enable the performance of tasks related to graphics rendering, video compression, image resealing, etc., using components separate and distinct from the processor component 350 and its more closely related components.

In various embodiments, each of the storages 360, 460 and 660 may be based on any of a wide variety of information storage technologies. Such technologies may include volatile technologies requiring the uninterrupted provision of electric power and/or technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
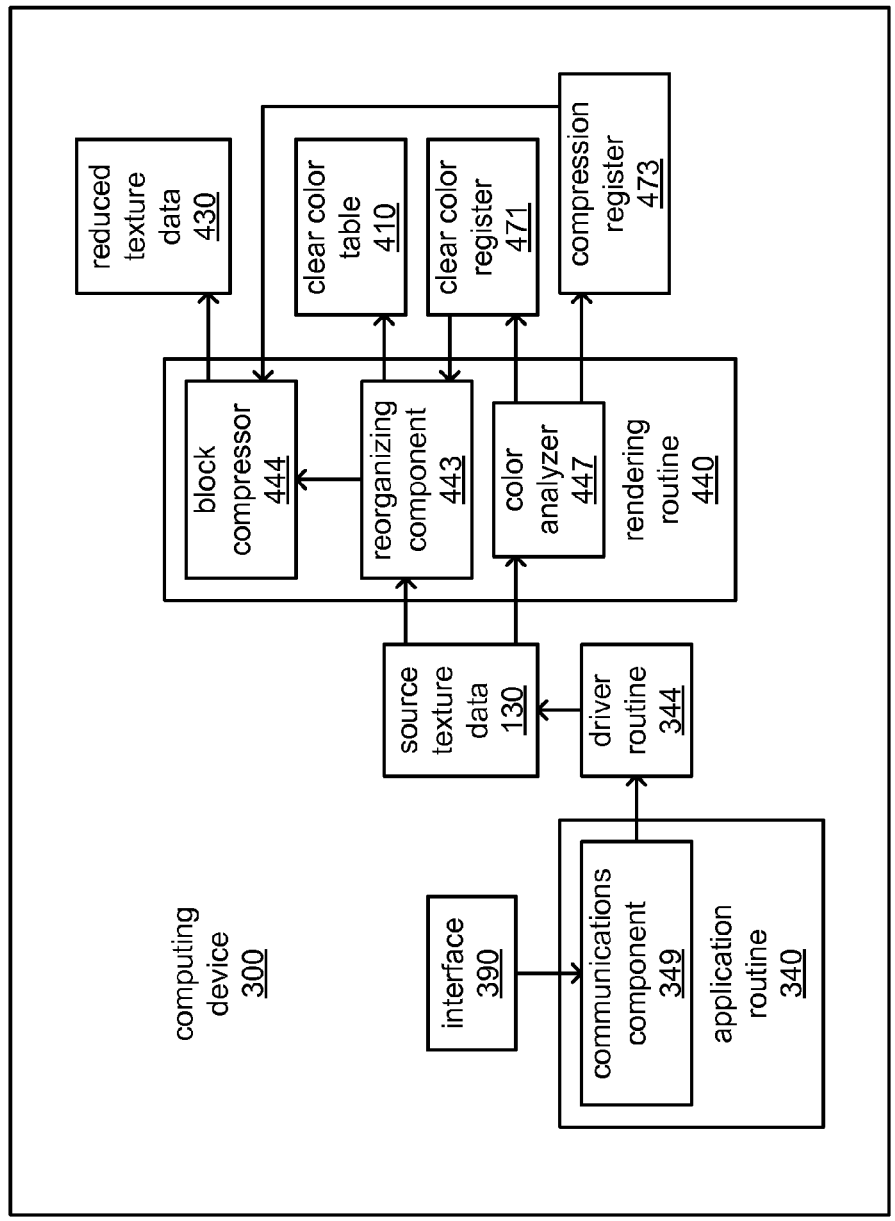
FIGS. 6-7 each illustrate a portion of an embodiment.
Figure 7:
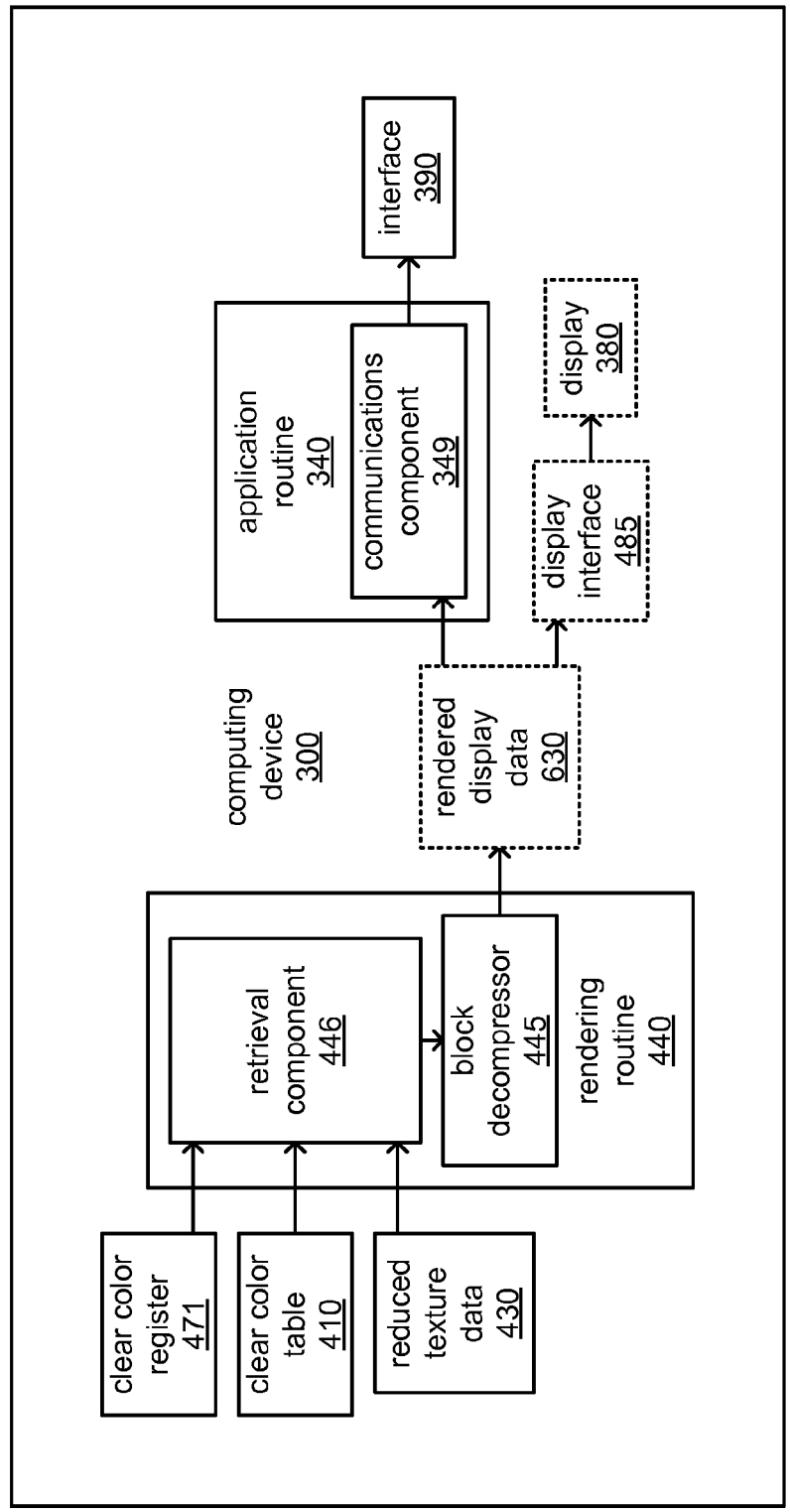

FIGS. 6 and 7 each illustrate a block diagram of a portion of an embodiment of the rendering system 1000 of FIG. 1 or 2 in greater detail. More specifically, FIG. 6 depicts aspects of the operating environment of the computing device 300 in which either the processor component 350 or 450, in executing the rendering routine 440, renders the texture image 830 into a portion of the storage 460 to generate the reduced texture data 430 from the source texture data 130. FIG. 7 depicts aspects of the operating environment of the computing device 300 in which either the processor component 350 or 450, in executing the rendering routine 440, renders an image represented by the rendered display data 630 using the texture image 830 represented by the reduced texture data 430 to apply a texture to an object in that rendered image. As recognizable to those skilled in the art, the rendering routine 440, including the components of which each is composed, are selected to be operative on whatever type of processor or processors that are selected to implement applicable ones of the processor components 350 or 450.

In various embodiments, each of the application routine 340, the driver routine 344 and the rendering routine 440 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 or 450. Where one or more device drivers are included, those device drivers may provide support for any of a variety of other components, whether hardware or software components, of corresponding ones of the computing devices 300 or the controller 400.

The application routine 340 may include a communications component 349 executable by the processor component 350 to operate the interface 390 to transmit and receive signals via the network 999 as has been described. Among the signals received may be signals conveying the source texture data 130 and/or the compressed rendered display data 630 among one or more of the computing devices 100, 300 or 600 via the network 999. As will be recognized by those skilled in the art, the communications component is selected to be operable with whatever type of interface technology is selected to implement the interface 390.

Turning more specifically to FIG. 6, in embodiments in which the source texture data 130 is received from another computing device, the communications component 349 may so receive the source texture data 130 from the source device 100 via the network 999. Upon such receipt of the source texture data 130, the communications component 349 and/or another component of the application routine 340 provides the source texture data 130 to the rendering routine 440 through the driver routine 344. As previously discussed, the driver routine 344 and/or the application routine 340 may signal the rendering routine 440 to render the texture image 830 of the source texture data 130 to generate the reduced texture data 430, rather than to simply generate a copy of the source texture data 130.

The rendering routine 440 may include a color analyzer 447 executable by the processor component 350 or 450 to employ one or more techniques to determine the clear color of the texture image 830 in the source texture data 130. As previously discussed, any of a variety of heuristic algorithms may be used, including and not limited to analyzing the colors of the pixels at the corners of the texture image 830. Upon being determined, a pixel color value indicative of the clear color may be stored in the clear color register 471.

The rendering routine 440 may include a reorganizing component 443 executable by the processor component 350 or 450 to reorganize the pixel color values of the pixels of the source texture data 130 from a raster-scan order to a tiled order as the rendering routine 440 fills the reduced texture data 430 with pixel color values. In some embodiments, the reorganizing component 443 implements logic of a rendering shader that causes the selective writing of pixel color values into the reduced texture data 430. More specifically, the reorganizing component 443 may store only pixel color values of pixels not colored with the clear color. In so doing, the reorganizing component 443 may refer to the clear color register 471 storing an indication of the pixel color value associated with the clear color to identify which pixels are colored with the clear color. The reorganizing component 443 may also store indications of which pixels (or groups of pixels) of the texture image 830 are colored with a color other than the clear color in the clear color table 410 (following initialization of the clear color table 410 to indicate all pixels as colored with the clear color, as previously discussed).

The rendering routine 440 may include a block compressor 444 executable by the processor component 350 or 450 to analyze sets of pixel color values associated with each sub-block 836 of pixels, to identify adjacent sub-blocks 836 of pixels with sets of pixel color values that can be compressed to fit entirely within a single storage area otherwise allocated to only a single set of pixel color values of a single one of the sub-blocks 836. Upon identifying such adjacent sub-blocks 836 (e.g., adjacent pairs, triplet or quartets of sub-blocks 836), the block compressor 444 employs any of a variety of types of compression to compress the sets of pixel color values associated with those sub-blocks 836 and organize those sets of pixel color values to fit within a single storage area otherwise allocated to only one of those sub-blocks 836. As previously discussed, it may be deemed desirable to use a relatively simple type of lossless compression to avoid significant increases in processing requirements that may significantly increase electrical power consumption, and to loss of detail in the texture image 830. Regardless of the type of compression used, the block compressor 444 performs this compression of two or more adjacent ones of the sub-blocks 836 as the pixel color values of those blocks are stored as part of the reduced texture data 430.

Turning more specifically to FIG. 7, the communications component 349 of the application routine 340 may operate the interface 390 to transmit the rendered display data 630 representing a rendered display image to the display device 600 via the network 999. Alternatively or additionally, the rendered display image of the rendered display data 630 may be visually presented on the display 380 (if present). In some embodiments, the rendering routine 440 and/or the application routine 340 may include a presentation component (not shown) to operate the display interface 485 to retrieve the rendered display data 630 and transmit the rendered display image thereof to the display 380. The rendered display image represented by the rendered display data 630 may be rendered by the rendering engine logic of the rendering routine 440, using the texture image 830 as stored in the reduced texture data 430 to apply one or more textures to one or more objects within the rendered display image.

The rendering routine 440 may include a retrieval component 446 executable by the processor component 350 or 450 to selectively retrieve pixel color values of pixels required to apply textures from either the reduced texture data 430 or the clear color register 471. The retrieval component 446 may employ the clear color table 410 in determining whether to retrieve a pixel color value for each of the required pixels from the reduced texture data 430 or the clear color register 471. Where the clear color table 410 indicates that a required pixel is not colored with the clear color, then the retrieval component 446 may retrieve the pixel color value for that pixel from the reduced texture data 430. Where the clear color table 410 indicates that a required pixel is colored with the clear color (or is among a group of pixels colored with the clear color), then the retrieval component 446 may retrieve the pixel color value for the clear color from the clear color register 471.

The rendering routine 440 may include a block decompressor 445 executable by the processor component 350 or 450 to selectively decompress sets of pixel color values associated with blocks 835 of pixels depending on whether the required pixels are retrieved from blocks associated with sets of pixel color values that have been compressed. As previously described, sets of pixel color values of adjacent sub-blocks 836 may be compressed together if the sets of pixel color values of those adjacent blocks are able to fit within a single storage area otherwise allocated for storing the set of pixel color values of a single sub-block 836 in uncompressed form.

Figure 8:
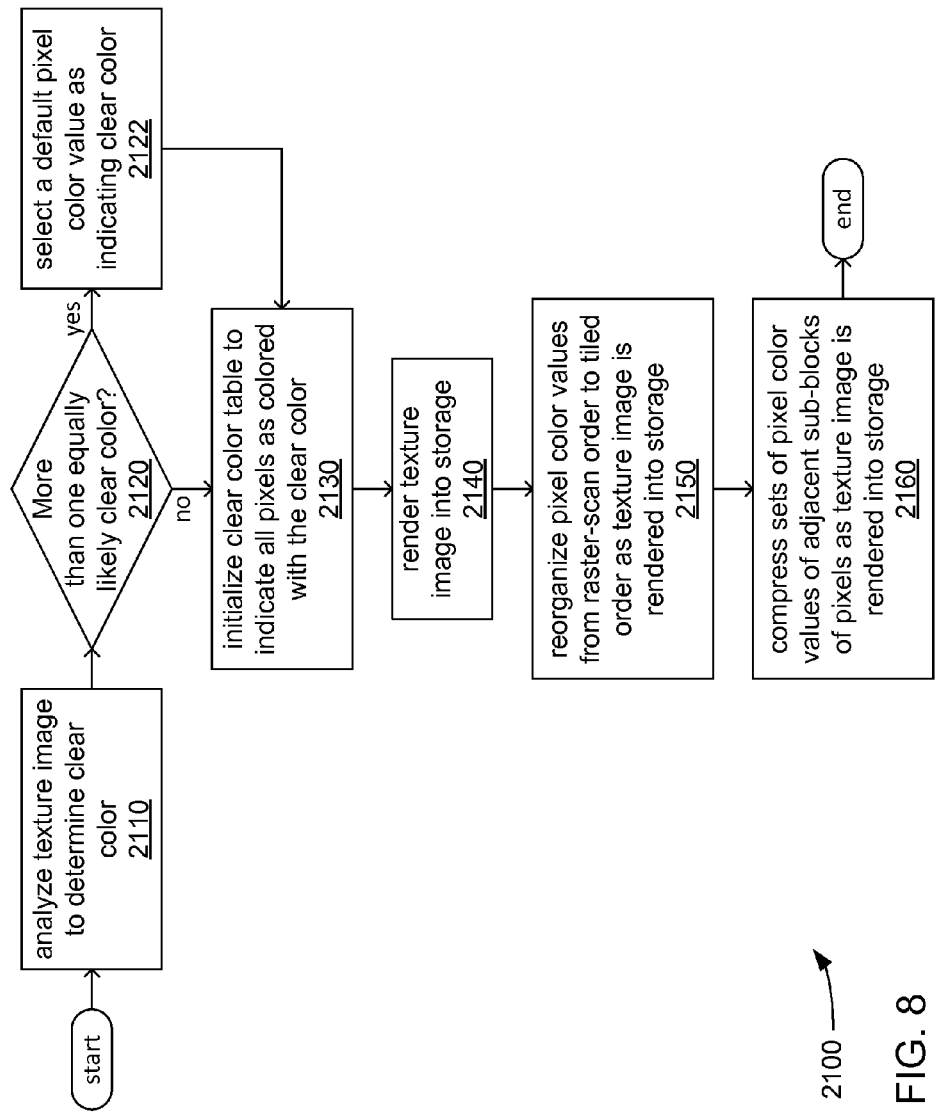
FIGS. 8-9 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor component 350 or 450 in executing at least the rendering routine 440, and/or performed by other component(s) of the computing device 300 or the controller 400, respectively.

At 2110, a processor component of a computing device (e.g., either the processor component 350 of the computing device 300, or the processor component 450 of the controller 400) analyzes a texture image to determine its clear color. More specifically, an uncompressed texture data representing a texture image (e.g., the source texture data 130 representing the texture image 830) is analyzed to determine and record the pixel color value of its pixel color. As previously discussed, various techniques may be used (e.g., various heuristic algorithms) to do so, including analyzing the pixels at the corners of the texture image. As also previously discussed, the clear color table may provide indications of what pixels are colored with the clear color or what groups of pixels are entirely colored with the clear color.

At 2120, if analysis to determine the clear color reveals two or more colors that are substantially equally likely to be the clear color, then a default pixel color value is resorted to as indicating the clear color at 2122. As previously discussed, such a default pixel color value may be all 0's indicative of the color black, or all 1's indicative of the color white.

At 2130, a clear color table (e.g., the clear color table 410) is initialized with indications that all of the pixels of the texture image are colored with the clear color, and at 2140, the texture image is rendered into a portion of a storage as reduced texture data from which portions will be repeatedly retrieved to apply textures to objects being rendered during rending of a display image. As previously discussed, during such rendering, a rendering shader may be employed to selectively store pixel color values in the reduced texture data as the texture image is rendered into the portion of the storage. Specifically, pixels colored with the clear color are not stored in the reduced texture data while pixels not colored with the clear color are so stored.

At 2150, the pixel color values of the reduced texture data are reorganized from a raster-scan order to a tiled order as the texture image is rendered into the portion of the storage as reduced texture data. As previously discussed, such reordering entails the defining of blocks of pixels having associated storage areas within the storage in which sets of pixel color values for the pixels of each block are individually stored.

At 2160, pixel color values of adjacent sub-blocks within each of the blocks of the texture image are selectively compressed together as the texture image is rendered into the portion of the storage as reduced texture data. If the pixel color values of two or more adjacent sub-blocks are able to be compressed sufficiently that they are to fit within a single storage area associated with one of those sub-blocks, then such compression is performed.

Figure 9:
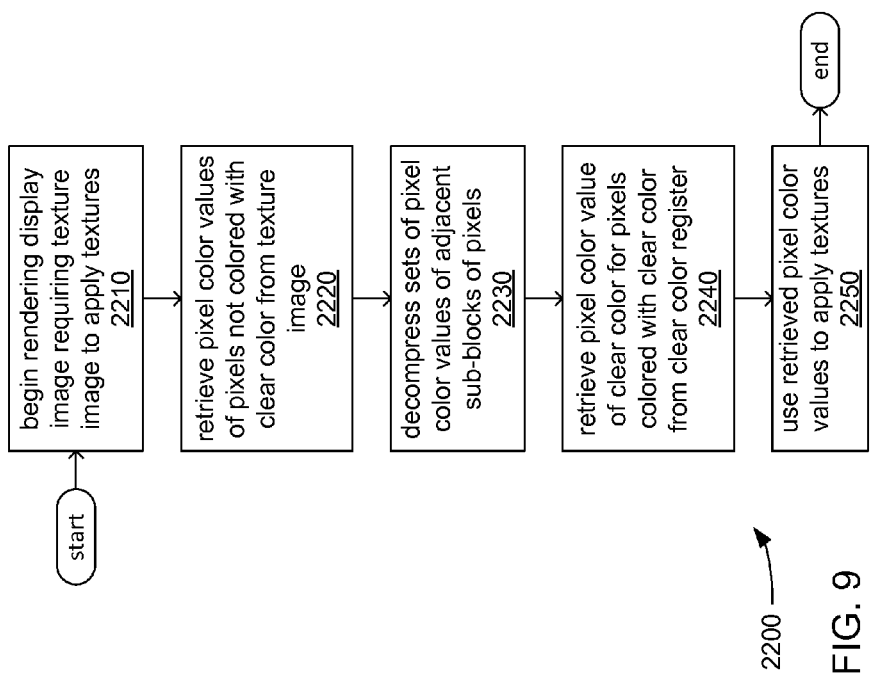

FIG. 9 illustrates one embodiment of a logic flow 2200. The logic flow 2200 may be representative of some or all of the operations executed by one or more embodiments described herein. More specifically, the logic flow 2200 may illustrate operations performed by the processor component 350 or 450 in executing at least the rendering routine 440, and/or performed by other component(s) of the computing device 300 or the controller 400, respectively.

At 2210, a processor component of a computing device (e.g., either the processor component 350 of the computing device 300, or the processor component 450 of the controller 400) begins rendering a display image (e.g., the rendered display image represented by the rendered display data 630) that includes one or more objects to which textures must be applied using a texture image (e.g., the texture image 830). As previously discussed, 2D portions of the texture image are retrieved from a reduced texture data (e.g., the reduced texture data 430) stored in a storage, the reduced texture data representing the texture image.

At 2220, pixel color values of pixels not colored with a clear color in the texture image are retrieved from the reduced texture data. As previously discussed, the clear color may have been earlier determined and indications of which pixels of the texture image are colored with the clear color may have been earlier stored in a table (e.g., the clear color table 410). Such a table (or other similar data structure) may be referred to during retrieval of pixel color values for pixels required for applying a texture to determine whether to retrieve their pixel color values from the reduced texture data.

At 2230, sets of pixel color values that include pixel color values of the pixels required for texture application are decompressed. As previously discussed, sets of pixel color values of adjacent sub-blocks of blocks of pixels in the texture image may be selectively compressed depending on the degree of compression able to be achieved using a selected type of compression. Specifically, where two or more of such sets of pixel color values are able to be compressed together so that they fit entirely within a storage area originally allocated for only one of them, then such compression of those sets of pixel color values is performed.

At 2240, the pixel color value of the clear color is retrieved from a clear color register for pixels indicated in the table as colored with the clear color in the texture image. As previously discussed, such retrieval of the pixel color value for the clear color from a register, as opposed to retrieving it from the reduced texture data, reduces the storage access bandwidth.

At 2250, the retrieved pixel color values of the pixels required for applying a texture to an object in the display image are used to apply that texture. As previously discussed, there may be multiple accesses to the reduced texture data to retrieve pixels of different portions of the texture image to apply different textures.

Figure 10:
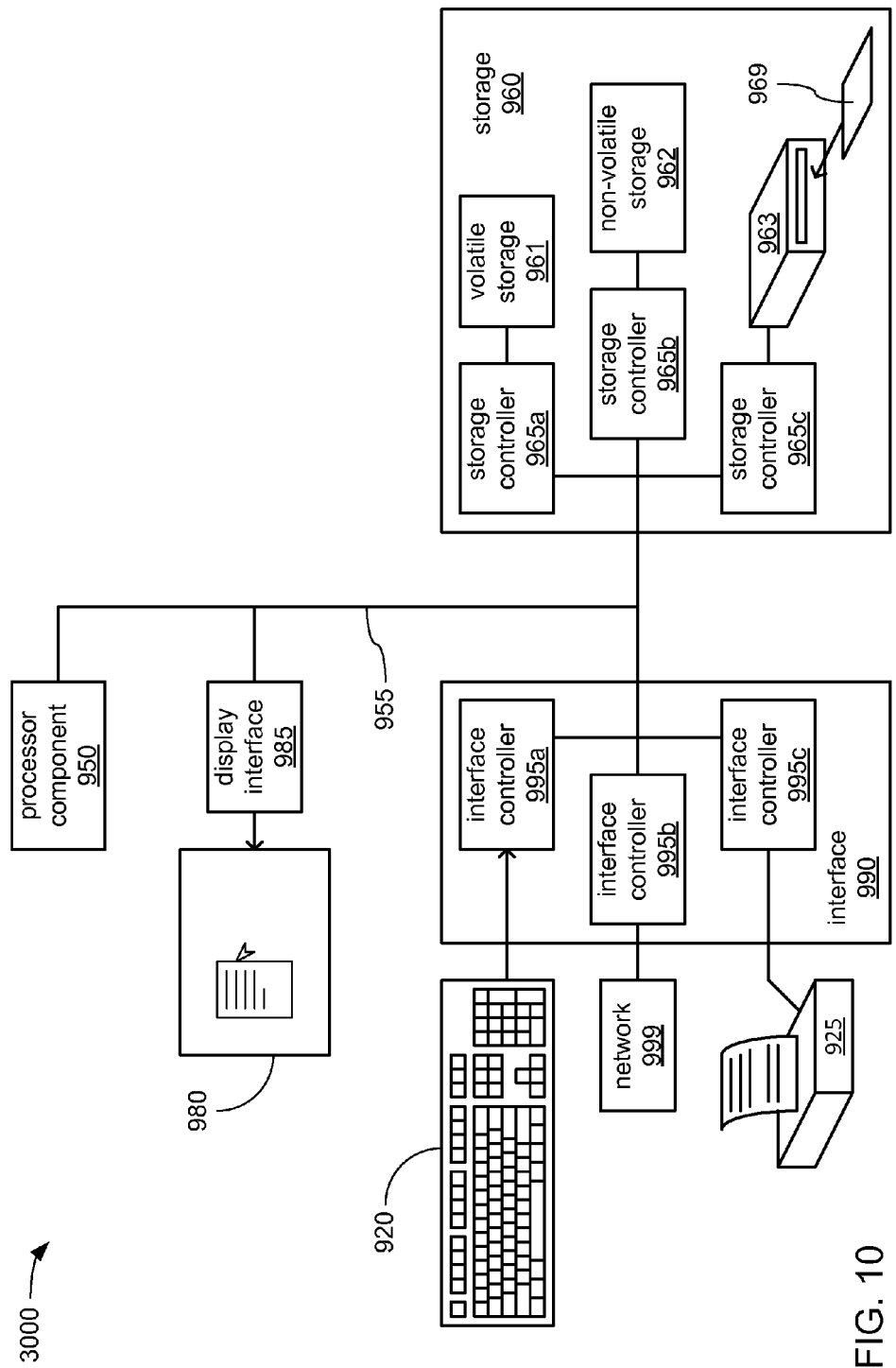
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 such that it may include multiple distinct types of storage is in recognition of the commonplace use of more than one type of storage device in computing devices in which one type provides relatively rapid reading and writing capabilities enabling more rapid manipulation of data by the processor component 950 (but which may use a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

FIG. 11 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or both of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350 or 650, and/or to processor component 950 of FIG. 10.

Memory unit 4969 may be implemented using any machine-readable or computer-readable media capable of storing data, and may be the same as or similar to storage media 969 of FIG. 10.

Transceiver 4995 may include one or more radios capable of transmitting and receiving signals using various suitable wireless communications techniques, and may be the same as or similar to transceiver 995*b* in FIG. 10.

Display 4980 may include any television type monitor or display, and may be the same as or similar to one or more of displays 380 and 680, and/or to display 980 in FIG. 10.

Storage 4962 may be implemented as a non-volatile storage device, and may be the same as or similar to non-volatile storage 962 in FIG. 10.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900*b* may be hosted by any national, international and/or independent service and thus accessible to platform 4900*a* via the Internet, for example. Content services device(s) 4900*b* may be coupled to platform 4900*a* and/or to display 4980. Platform 4900*a* and/or content services device(s) 4900*b* may be coupled to a network 4999 to communicate (e.g., send and/or receive) media information to and from network 4999. Content delivery device(s) 4900*c* also may be coupled to platform 4900*a* and/or to display 4980.

In embodiments, content services device(s) 4900*b* may include a cable television box, personal computer, network, telephone, Internet enabled devices or appliance capable of delivering digital information and/or content, and any other similar device capable of unidirectionally or bidirectionally communicating content between content providers and platform 4900*a* and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900*b* receives content such as cable television programming including media information, digital information, and/or other content. Examples of content providers may include any cable or satellite television or radio or Internet content providers. The provided examples are not meant to limit embodiments.

In embodiments, platform 4900*a* may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900*a* and/or display 4980. Embodiments, however, are not limited to the elements or in the context shown or described herein.

In embodiments, drivers (not shown) may include technology to enable users to instantly turn on and off platform 4900*a* like a television with the touch of a button after initial boot-up, when enabled, for example. Program logic may allow platform 4900*a* to stream content to media adaptors or other content services device(s) 4900*b* or content delivery device(s) 4900*c* when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900*a* and content services device(s) 4900*b* may be integrated, or platform 4900*a* and content delivery device(s) 4900*c* may be integrated, or platform 4900*a*, content services device(s) 4900*b*, and content delivery device(s) 4900*c* may be integrated, for example. In various embodiments, platform 4900*a* and display 4890 may be an integrated unit. Display 4980 and content service device(s) 4900*b* may be integrated, or display 4980 and content delivery device(s) 4900*c* may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
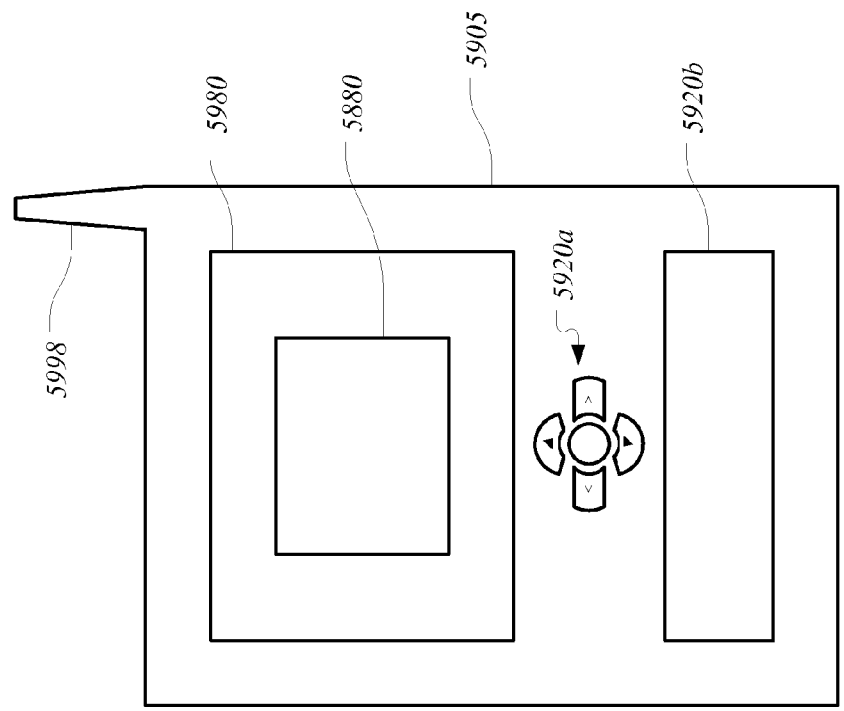
FIG. 12 illustrates an embodiment of a device.

As described above, system 4000 may be embodied in varying physical styles or form factors. FIG. 12 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 11. Navigation controller 5920a may include one or more navigation features which may be used to interact with user interface 5880, and may be the same as or similar to navigation controller 4920 in FIG. 11. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In some examples, a device to render images may include a processor component, a color analyzer for execution by the processor component to determine a clear color of a texture image stored as source texture data, and a rendering routine for execution by the processor component to render the texture image into a storage as reduced texture data, the rendering routine to selectively store in the reduced texture data pixel color values retrieved from the source texture data that are associated with pixels of the texture image not colored with the clear color.

Additionally or alternatively, the device may include a clear color register, the color analyzer to determine a pixel color value indicative of the clear color and to store the pixel color value indicative of the clear color in the clear color register.

Additionally or alternatively, the rendering routine may employ a rendering shader to selectively store pixel color values retrieved from the source texture data that are associated with pixels of the texture image not colored with the clear color based on a comparison of every pixel color value retrieved from the source texture data to the pixel color value indicative of the clear color stored in the clear color register.

Additionally or alternatively, the color analyzer may determine the clear color from an analysis of colors of pixels at corners of the texture image.

Additionally or alternatively, the device may include a reorganizing component for execution by the processor component to reorganize a raster-scan order of pixel color values of the reduced texture data in the storage into a tiled order in the storage based on a division of the texture image into a tiled array of multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

Additionally or alternatively, the device may include a block compressor for execution by the processor component to selectively compress at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

Additionally or alternatively, the block compressor may employ a lossless type of compression.

Additionally or alternatively, the type of compression may include one of Huffman coding or run-length encoding.

Additionally or alternatively, the device may include a retrieval component for execution by the processor component to selectively retrieve pixel color values of pixels of the texture image required to apply a texture to a rendered object from the reduced texture data based on indications in a clear color table of which pixels of the texture image are colored with the clear color.

Additionally or alternatively, the color analyzer may determine a pixel color value indicative of the clear color, and the rendering routine may store the indications in the clear color table based on a comparison of every pixel color value retrieved from the source texture data to the pixel color value indicative of the clear color.

Additionally or alternatively, the indications may include indications of groups of pixels of the texture image in which all pixels are colored with the clear color.

Additionally or alternatively, the device may include a block decompressor to decompress sets of pixel color values associated with blocks of pixels of the texture image, the blocks of pixels associated with a tiled order of the pixel color values of the reduced texture data.

Additionally or alternatively, the device may include an interface to receive the source texture data from a computing device.

In some examples, a device to render images may include a processor component, and a retrieval component for execution by the processor component to selectively retrieve pixel color values of pixels of a texture image required to apply a texture to a rendered object of a rendered display image from a reduced texture data based on indications of pixels of the texture image that are colored with a clear color, the texture image stored in a storage as the reduced texture data.

Additionally or alternatively, the device may include a clear color register to store a pixel color value indicative of the clear color.

Additionally or alternatively, the device may include a color analyzer for execution by the processor component to determine the clear color of the texture image.

Additionally or alternatively, the device may include a rendering routine for execution by the processor component to derive the indications based on a comparison of every pixel color of the texture image to a pixel color value indicative of the clear color, the color analyzer to determine the pixel color value indicative of the clear color.

Additionally or alternatively, the device may include a block decompressor to decompress sets of pixel color values associated with blocks of pixels of the texture image, the blocks of pixels associated with a tiled order of the pixel color values of the reduced texture data.

Additionally or alternatively, the device may include an interface to transmit the rendered display image to a computing device.

Additionally or alternatively, the device may include a display to visually present the rendered display image.

In some examples, a computer-implemented method for rendering images may include determining a clear color of a texture image stored as source texture data, rendering the texture image into a storage as reduced texture data by selectively storing in the reduced texture data pixel color values retrieved from the source texture data that are associated with pixels of the texture image not colored with the clear color, and selectively retrieving pixel color values of pixels of the texture image required to apply a texture to a rendered object from the reduced texture data based on indications of which pixels of the texture image are colored with the clear color.

Additionally or alternatively, the method may include determining a pixel color value indicative of the clear color.

Additionally or alternatively, the method may include employing a rendering shader to selectively store pixel color values retrieved from the source texture data that are associated with pixels of the texture image not colored with the clear color based on a comparison of every pixel color value retrieved from the source texture data to the pixel color value indicative of the clear color.

Additionally or alternatively, the method may include storing the indications in a clear color table based on a comparison of every pixel color value retrieved from the source texture data to the pixel color value indicative of the clear color.

Additionally or alternatively, the method may include determining the clear color from an analysis of colors of pixels at corners of the texture image.

Additionally or alternatively, the method may include dividing the texture image into a tiled array of multiple blocks of pixels; and reorganizing a raster-scan order of pixel color values of the reduced texture data in the storage into a tiled order in the storage based on multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

Additionally or alternatively, the method may include selectively compressing at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

Additionally or alternatively, the method may include decompressing sets of pixel color values of the multiple sets of pixel color values.

Additionally or alternatively, the method may include receiving the source texture data from a computing device.

In some examples, at least one machine-readable storage medium may include instructions that when executed by a computing device, cause the computing device to determine a clear color of a texture image stored as source texture data, render the texture image into a storage of the computing device as reduced texture data by selectively storing in the reduced texture data pixel color values retrieved from the source texture data that are associated with pixels of the texture image not colored with the clear color, and selective retrieving pixel color values of pixels of the texture image required to apply a texture to a rendered object from the reduced texture data based on indications of which pixels of the texture image are colored with the clear color.

Additionally or alternatively, the computing device may be caused to determine a pixel color value indicative of the clear color.

Additionally or alternatively, the computing device may be caused to employ a rendering shader to selectively store pixel color values retrieved from the source texture data that are associated with pixels of the texture image not colored with the clear color based on a comparison of every pixel color value retrieved from the source texture data to the pixel color value indicative of the clear color.

Additionally or alternatively, the computing device may be caused to store the indications in a clear color table based on a comparison of every pixel color value retrieved from the source texture data to the pixel color value indicative of the clear color.

Additionally or alternatively, the computing device may be caused to determine the clear color from an analysis of colors of pixels at corners of the texture image.

Additionally or alternatively, the computing device may be caused to divide the texture image into a tiled array of multiple blocks of pixels; and reorganize a raster-scan order of pixel color values of the reduced texture data in the storage into a tiled order in the storage based on multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

Additionally or alternatively, the computing device may be caused to selectively compress at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

Additionally or alternatively, the computing device may be caused to decompress sets of pixel color values of the multiple sets of pixel color values.

Additionally or alternatively, the computing device may be caused to receive the source texture data from a computing device.

The invention claimed is:

1. A device to render images comprising:
   a processor component;
   a color analyzer for execution by the processor component to determine a clear color of a texture image stored as source texture data, the color analyzer to determine the clear color from an analysis of colors of pixels at corners of the texture image; and
   a rendering routine for execution by the processor component to render the texture image into a storage as reduced texture data, the rendering routine to selectively store in the reduced texture data pixel color values retrieved from the source texture data that are associated with pixels of the texture image not colored with the clear color.

2. The device of claim 1, comprising a clear color register, the color analyzer to determine a pixel color value indicative of the clear color and to store the pixel color value indicative of the clear color in the clear color register.

3. The device of claim 2, the rendering routine to employ a rendering shader to selectively store pixel color values retrieved from the source texture data that are associated with pixels of the texture image not colored with the clear color based on a comparison of every pixel color value retrieved from the source texture data to the pixel color value indicative of the clear color stored in the clear color register.

4. The device of claim 1, comprising a reorganizing component for execution by the processor component to reorganize a raster-scan order of pixel color values of the reduced texture data in the storage into a tiled order in the storage based on a division of the texture image into a tiled array of multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

5. The device of claim 4, comprising a block compressor for execution by the processor component to selectively compress at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

6. The device of claim 1, comprising a retrieval component for execution by the processor component to selectively retrieve pixel color values of pixels of the texture image required to apply a texture to a rendered object from the reduced texture data based on indications in a clear color table of which pixels of the texture image are colored with the clear color.

7. The device of claim 6, the color analyzer to determine a pixel color value indicative of the clear color, and the rendering routine to store the indications in the clear color table based on a comparison of every pixel color value retrieved from the source texture data to the pixel color value indicative of the clear color.

8. The device of claim 1, comprising an interface to receive the source texture data from a computing device.

9. A device to render images comprising:
a processor component;
a retrieval component for execution by the processor component to selectively retrieve pixel color values of pixels of a texture image required to apply a texture to a rendered object of a rendered display image from a reduced texture data based on indications of pixels of the texture image that are colored with a clear color, the texture image stored in a storage as the reduced texture data; and
a color analyzer for execution by the processor component to determine the clear color from an analysis of colors of pixels at corners of the texture image.

10. The device of claim 9, comprising a rendering routine for execution by the processor component to derive the indications based on a comparison of every pixel color of the texture image to a pixel color value indicative of the clear color, the color analyzer to determine the pixel color value indicative of the clear color.

11. The device of claim 9, comprising a block decompressor to decompress sets of pixel color values associated with blocks of pixels of the texture image, the blocks of pixels associated with a tiled order of the pixel color values of the reduced texture data.

12. The device of claim 9, comprising a display to visually present the rendered display image.

13. A computer-implemented method for rendering images comprising:
determining, from an analysis of colors of pixels at corners of a texture image stored as source texture data, a clear color of the texture image;
rendering the texture image into a storage as reduced texture data by selectively storing in the reduced texture data pixel color values retrieved from the source texture data that are associated with pixels of the texture image not colored with the clear color; and
selectively retrieving pixel color values of pixels of the texture image required to apply a texture to a rendered object from the reduced texture data based on indications of which pixels of the texture image are colored with the clear color.

14. The computer-implemented method of claim 13, the method comprising determining a pixel color value indicative of the clear color.

15. The computer-implemented method of claim 14, the method comprising employing a rendering shader to selectively store pixel color values retrieved from the source texture data that are associated with pixels of the texture image not colored with the clear color based on a comparison of every pixel color value retrieved from the source texture data to the pixel color value indicative of the clear color.

16. The computer-implemented method of claim 13, the method comprising
dividing the texture image into a tiled array of multiple blocks of pixels; and
reorganizing a raster-scan order of pixel color values of the reduced texture data in the storage into a tiled order in the storage based on multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

17. The computer-implemented method of claim 16, the method comprising selectively compressing at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

18. The computer-implemented method of claim 13, the method comprising receiving the source texture data from a computing device.

19. At least one non-transitory machine-readable storage medium comprising instructions that when executed by a computing device, cause the computing device to:
determine, from an analysis of colors of pixels at corners of a texture image stored as source texture data, a clear color of the texture image;
render the texture image into a storage of the computing device as reduced texture data by selectively storing in the reduced texture data pixel color values retrieved from the source texture data that are associated with pixels of the texture image not colored with the clear color; and
selective retrieving pixel color values of pixels of the texture image required to apply a texture to a rendered object from the reduced texture data based on indications of which pixels of the texture image are colored with the clear color.

20. The at least one non-transitory machine-readable storage medium of claim 19, the computing device caused to store the indications in a clear color table based on a comparison of every pixel color value retrieved from the source texture data to the pixel color value indicative of the clear color.

21. The at least one non-transitory machine-readable storage medium of claim 19, the computing device caused to:

divide the texture image into a tiled array of multiple blocks of pixels; and reorganize a raster-scan order of pixel color values of the reduced texture data in the storage into a tiled order in the storage based on multiple blocks of pixels, the pixel color values associated with pixels of each block of the multiple blocks organized into a contiguously stored set of pixel color values of multiple sets of pixel color values, and each set of pixel color values of the multiple sets stored in a separate storage area of multiple storage areas contiguously arranged in the storage.

22. The at least one non-transitory machine-readable storage medium of claim 21, the computing device caused to selectively compress at least two sets of the multiple sets of pixel color values, the at least two sets associated with at least two blocks of the multiple blocks adjacently located in the texture image based on a determination of whether the pixel color values of the at least two blocks fit entirely within a single storage area of the multiple storage areas following compression.

* * * * *